US011917625B2

United States Patent
Lin

(10) Patent No.: US 11,917,625 B2
(45) Date of Patent: *Feb. 27, 2024

(54) WIRELESS COMMUNICATIONS METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/453,358

(22) Filed: Nov. 3, 2021

(65) Prior Publication Data

US 2022/0061045 A1 Feb. 24, 2022

Related U.S. Application Data

(63) Continuation of application No. 16/997,336, filed on Aug. 19, 2020, now Pat. No. 11,197,280, which is a continuation of application No. PCT/CN2018/073515, filed on Jan. 19, 2018.

(51) Int. Cl.
*H04W 72/21* (2023.01)

(52) U.S. Cl.
CPC .................................. *H04W 72/21* (2023.01)

(58) Field of Classification Search
CPC ................................................ H04W 72/0413

USPC .......................................................... 370/329
See application file for complete search history.

(56) References Cited

U.S. PATENT DOCUMENTS

| | | |
|---|---|---|
| 6,665,277 B1 | 12/2003 | Sriram |
| 9,030,957 B2 | 5/2015 | Seo |
| 9,060,360 B2 | 6/2015 | Yang |
| 2013/0114461 A1 | 5/2013 | Seo |
| 2013/0128834 A1 | 5/2013 | Higuchi |
| 2014/0098782 A1 | 4/2014 | Shirazi et al. |
| 2017/0013612 A1 | 1/2017 | Nayeb Nazar et al. |
| 2017/0150501 A1 | 5/2017 | Park |
| 2017/0374656 A1 | 12/2017 | Kim et al. |

(Continued)

FOREIGN PATENT DOCUMENTS

| | | |
|---|---|---|
| CN | 103098398 A | 5/2013 |
| CN | 104937875 A | 9/2015 |

(Continued)

OTHER PUBLICATIONS

3GPP. "3GPP Technical Specification Group Radio Access Network; NR; Physical Layer Procedures for Control (Release 15)" 3GPP TS 38.213 V15.0.0 (Dec. 2017), Jan. 3, 2018 (Jan. 3, 2018), section 9.2.

(Continued)

*Primary Examiner* — Chi Tang P Cheng
(74) *Attorney, Agent, or Firm* — PERKINS COIE LLP

(57) ABSTRACT

The present application provides a wireless communication method, a terminal device, and a network device. The method comprises: a terminal device determines, according to the number of bits of UCI to be transmitted and the spreading factor of a first PUCCH format, the number of PRBs for transmitting the UCI to be transmitted.

8 Claims, 3 Drawing Sheets

(56) References Cited

U.S. PATENT DOCUMENTS

| | | | |
|---|---|---|---|
| 2018/0198569 A1 | 7/2018 | Lyu et al. | |
| 2018/0279295 A1 | 9/2018 | Gao et al. | |
| 2019/0140793 A1* | 5/2019 | Takeda | H04L 5/0016 |

FOREIGN PATENT DOCUMENTS

| | | |
|---|---|---|
| CN | 106060930 A | 10/2016 |
| EP | 3340505 A1 | 6/2018 |
| EP | 3355506 A1 | 8/2018 |
| RU | 2521089 C2 | 6/2014 |
| WO | 2017022593 A1 | 2/2017 |
| WO | 2017041305 A1 | 3/2017 |
| WO | 2017050062 A1 | 3/2017 |

OTHER PUBLICATIONS

International Search Report in the international application No. PCT/CN2018/073515, dated Sep. 25, 2018.
Written Opinion of the International Search Authority in the international application No. PCT/CN2018/073515, dated Sep. 25, 2018.
Supplementary European Search Report in the European application No. 18901090.3, dated Dec. 4, 2020.
First Office Action of the Russian application No. 2020127284, dated Jan. 18, 2021.
First Office Action of the European application No. 18901090.3, dated Aug. 2, 2021.
Office Action of the Indian application No. 202017035618, dated Sep. 21, 2021.
Non-Final Office Action of the U.S. Appl. No. 16/997,336, dated Apr. 13, 2021.
Restriction Requirement of the U.S. Appl. No. 16/997,336, dated Jan. 15, 2021.
Notice of Allowance of the U.S. Appl. No. 16/997,336, dated Jul. 21, 2021.
Huawei et al. "Number of PRBs for PUCCH format 2 and PUCCH format 3" 3GPP TSG RAN WG1 Ad Hoc Meeting R1-1800840, Vancouver, Canada, Jan. 22-26, 2018. 3 pages.
Intel Corporation "Collection of corrections on PUCCH in TS 38.211/212/213" 3GPP TSG RAN WG1 Meeting AH 1801 R1-1800725, Vancouver, Canada, Jan. 22-26, 2018. 7 pages.
Ericsson "Design of LDPC Codes for NR" R1-1611321; 3GPP TSG RAN WG1 Meeting #87, Reno, USA, Nov. 14-18, 2016. 11 pages.
Huawei et al. "Summary of remaining issues on resource allocation for PUCCH" 3GPP TSG RAN WG1 Ad Hoc Meeting R1-1800074, Vancouver, Canada, Jan. 22-26, 2018. 4 pages.
3GPP "Physical channels and modulation (Release 15)" 3GPP TS 38.211 V15.0.0 (Dec. 2017) 73 pages.
NTT DOCOMO et al. "Long-PUCCH for UCI of more than 2 bits" R1-1708474, 3GPP TSG RAN WG1 Meeting #89; Hangzhou, P.R. China; May 15-19, 2017. 5 pages.
European Search Report in the European application No. 22169299.9, dated May 20, 2022. 9 pages.
3GPP, TS 38.213 v1.3.0, NR; Physical layer procedures for control, 3GPP(Dec. 15, 2017). 58 pages.
First Office Action of the Korean application No. 10-2020-7023809, dated Dec. 22, 2021. 10 pages with English translation.
USPTO, Corrected Notice of Allowability for U.S. Appl. No. 16/997,336, dated Nov. 10, 2021. 6 pages.
First Office Action of the Australian application No. 2018403272, dated Jul. 7, 2023. 3 pages.
First Office Action of the Vietnamese application No. 1-2020-04734, dated Sep. 27, 2023, 4 pages with English translation.

* cited by examiner

US 11,917,625 B2

WIRELESS COMMUNICATIONS METHOD, TERMINAL DEVICE, AND NETWORK DEVICE

CROSS-REFERENCE TO RELATED APPLICATIONS

This is a continuation application of U.S. patent application Ser. No. 16/997,336, filed on Aug. 19, 2020, which is a continuation of International Patent Application No. PCT/CN2018/073515, filed on Jan. 19, 2018, the contents of which are hereby incorporated by reference in their entirety.

BACKGROUND

Five kind of physical uplink control channel (PUCCH) formats, namely, PUCCH formats 0 to 4, are supported in a 5th-Generation (5G) mobile communication technology New Radio (NR). An orthogonal spreading factor of PUCCH format 2 and an orthogonal spreading factor of PUCCH format 3 are 1, and an orthogonal spreading factor of PUCCH format 4 is 2 or 4. At the current stage, when a terminal device calculates a number of physical resource blocks (PRBs) for transmitting uplink control information (UCI), the impact of spreading is not taken into account. Consequently, after a number of PRBs is calculated, the PRBs are insufficient to carry all UCI, and as a result UCI cannot be normally transmitted.

SUMMARY

This application relates to the communications field.

Implementation of this application provide a wireless communications method, a terminal device, and a network device.

According to a first aspect, an implementation of this application provides a wireless communications method, including:
  determining, by a terminal device, a value range of a code rate according to a spreading factor for a first PUCCH format;
  receiving, by the terminal device, control signaling sent by a network device, where the control signaling is used to indicate a target code rate for transmitting UCI by the first PUCCH format, and a value of the target code rate does not exceed the value range of the code rate; and
  determining, by the terminal device, the target code rate according to the control signaling.

Therefore, in the wireless communications method in this implementation of this application, the terminal device may determine the value range of the code rate according to the spreading factor for the first PUCCH format, so that the terminal device determines the target code rate for transmitting UCI in the value range of the code rate, thereby ensuring that UCI is reliably transmitted.

In an implementation of the first aspect, the determining, by a terminal device, a value range of a code rate according to a spreading factor for a first PUCCH format includes:
  determining, by the terminal device, that a value of the code rate is less than or equal to a first parameter, where the first parameter is equal to 1 divided by N, and N is the spreading factor for the first PUCCH format; and/or
  determining, by the terminal device, that a value of the code rate is greater than 0.

In an implementation of the first aspect, the determining, by the terminal device, the target code rate according to the control signaling includes:
  deeming, by the terminal device, it undesirable that the target code rate is greater than or equal to the first parameter.

In an implementation of the first aspect, the determining, by the terminal device, the target code rate according to the control signaling includes:
  determining, by the terminal device, that the target code rate is a maximum code rate used to transmit UCI by the first PUCCH format.

According to a second aspect, an implementation of this application provides a wireless communications method, including:
  sending, by a network device, control signaling to a terminal device, where the control signaling is used to indicate a target code rate at which the terminal device transmits UCI by a first PUCCH format, a value of the target code rate does not exceed a value range of a code rate, and the value range of the code rate is determined according to a spreading factor for the first PUCCH format.

Therefore, in the wireless communications method in this implementation of this application, the network device sends the control signaling to the terminal device, where the control signaling indicates the target code rate at which the terminal device transmits UCI by the first PUCCH format, so that the terminal device may determine the target code rate for transmitting UCI in the value range of the code rate, thereby ensuring that UCI is reliably transmitted.

According to a third aspect, an implementation of this application provides a wireless communications method, including:
  determining, by a terminal device according to a number of bits of the to-be-transmitted UCI and a spreading factor of a first PUCCH format, a number of PRBs for transmitting the to-be-transmitted UCI.

Therefore, in the wireless communications method in this implementation of this application, when the terminal device determines a number of PRBs for transmitting UCI, the impact of the spreading factor of the first PUCCH format is taken into account, so that after the number of PRBs for transmitting UCI is determined, the PRBs can carry all UCI, thereby ensuring that UCI is reliably transmitted.

In an implementation of the third aspect, the determining, by a terminal device according to a number of bits of the to-be-transmitted UCI and a spreading factor of a first PUCCH format, a number of PRBs for transmitting the to-be-transmitted UCI includes:
  determining, by the terminal device according to a number of bits of the to-be-transmitted UCI, the spreading factor of the first PUCCH format, and a first parameter, the number of PRBs for transmitting the to-be-transmitted UCI, where
  the first parameter includes at least one of a number of subcarriers for the first PUCCH format to transmit UCI in one resource block (RB), a number of time domain symbols for the first PUCCH format to transmit UCI, a modulation order, a maximum code rate corresponding to the first PUCCH format, and a maximum number of PRBs that corresponds to the first PUCCH format.

In an implementation of the third aspect, the number $M_{RB,min}^{PUCCH}$ of PRBs for transmitting the to-be-transmitted UCI satisfies:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r / N_{SF}^{PUCCH}$, and when the maximum number of PRBs that corresponds to the first PUCCH format is greater than 1, $(O_{UCI}+O_{CRC})>(M_{RB,min}^{PUCCH}-1)\cdot N_{sc,ctrl}^{RB}\cdot N_{symb}^{PUCCH}\cdot Q_m\cdot r/N_{SF}^{PUCCH}$; or $$M_{RB,min}^{PUCCH} = \left\lceil \frac{O_{UCI}+O_{CRC}}{N_{sc,ctrl}^{RB}\cdot N_{symb}^{PUCCH}\cdot Q_m\cdot r/N_{SF}^{PUCCH}} \right\rceil,$$

where $O_{UCI}$ represents a number of bits of the UCI, $O_{CRC}$ represents a number of bits of a cyclic redundancy check code (CRC), $N_{sc,ctrl}^{RB}$ represents the number of subcarriers for the first PUCCH format to transmit UCI in one RB, $N_{symb}^{PUCCH}$ represents the number of time domain symbols for the first PUCCH format to transmit UCI, $Q_m$ represents the modulation order, r represents the maximum code rate corresponding to the first PUCCH format, and $N_{SF}^{PUCCH}$ represents the spreading factor of the first PUCCH format.

In an implementation of the third aspect, the number $M_{RB,min}^{PUCCH}$ of PRBs for transmitting the to-be-transmitted UCI satisfies:

$(O_{UCI}+O_{CRC})\le M_{RB,min}^{PUCCH}\cdot N_{sc,ctrl}^{RB}\cdot N_{symb}^{PUCCH}\cdot Q_m\cdot r$, and when the maximum number of PRBs that corresponds to the first PUCCH format is greater than 1, $(O_{UCI}+O_{CRC})>(M_{RB,min}^{PUCCH}-1)\cdot N_{sc,ctrl}^{RB}\cdot N_{symb}^{PUCCH}\cdot Q_m\cdot r$; or $$M_{RB,min}^{PUCCH} = \left\lceil \frac{O_{UCI}+O_{CRC}}{N_{sc,ctrl}^{RB}\cdot N_{symb}^{PUCCH}\cdot Q_m\cdot r} \right\rceil,$$

where $O_{UCI}$ represents a number of bits of the UCI, $O_{CRC}$ represents a number of bits of a CRC, $N_{sc,ctrl}^{RB}$ represents the number of subcarriers for the first PUCCH format to transmit UCI in one RB divided by $N_{SF}^{PUCCH}$, $N_{SF}^{PUCCH}$ represents the spreading factor of the first PUCCH format, $N_{symb}^{PUCCH}$ represents the number of time domain symbols for the first PUCCH format to transmit UCI, $Q_m$ represents the modulation order, and r represents the maximum code rate corresponding to the first PUCCH format.

In an implementation of the third aspect, the to-be-transmitted UCI includes acknowledgement (ACK)/negative ACK (NACK) feedback information, and/or scheduling request (SR) information, and/or channel state information (CSI).

According to a fourth aspect, a terminal device is provided. The terminal device may perform operations of the terminal device according to any one of the first aspect or possible implementations of the first aspect. Specifically, the terminal device may include modular units configured to perform the operations of the terminal device according to any one of the first aspect or possible implementations of the first aspect.

According to a fifth aspect, a network device is provided. The network device may perform operations of the network device according to implementations of the second aspect. Specifically, the network device may include modular units configured to perform the operations of the network device according to the implementations of the second aspect.

According to a sixth aspect, a terminal device is provided. The terminal device may perform operations of the terminal device according to any one of the third aspect or possible implementations of the third aspect. Specifically, the terminal device may include modular units configured to perform the operations of the terminal device according to any one of the third aspect or possible implementations of the third aspect.

According to a seventh aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution causes the terminal device to perform the method according to any one of first aspect or possible implementations of the first aspect, or the execution causes the terminal device to implement the terminal device according to the fourth aspect.

According to an eighth aspect, a network device is provided. The network device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution causes the terminal device to perform the method according to any one of second aspect or possible implementations of the second aspect, or the execution causes the terminal device to implement the network device according to the fifth aspect.

According to a ninth aspect, a terminal device is provided. The terminal device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the execution causes the terminal device to perform the method according to any one of third aspect or possible implementations of the third aspect, or the execution causes the terminal device to implement the terminal device according to the sixth aspect.

According to a tenth aspect, a system chip is provided. The system chip includes an input interface, an output interface, a processor, and a memory. The processor is configured to execute an instruction stored in the memory, and when the instruction is executed, the processor can perform the method according to each of the foregoing aspects.

According to an eleventh aspect, a computer storage medium is provided. The computer storage medium stores program code, and the program code is used to instruct a computer to execute an instruction of the method according to each of the foregoing aspects.

A twelfth aspect provides a computer program product including an instruction, and when the computer program product is run on a computer, the computer is enabled to perform the method according to each of the foregoing aspects.

DETAILED DESCRIPTION

The technical solutions in the implementations of this application are described clearly with reference to the accompanying drawings in the implementations of this application below.

The technical solutions in the implementations of this application may be applied to various communications systems, such as: a Global System for Mobile Communications ("GSM" for short), a Code Division Multiple Access ("CDMA" for short) system, a Wideband Code Division Multiple Access ("WCDMA" for short) system, a general packet radio service ("GPRS" for short), a Long Term Evolution ("LTE" for short) system, an LTE frequency division duplex ("FDD" for short) system, an LTE time division duplex ("TDD" for short), a Universal Mobile Telecommunications System ("UMTS" for short), a Worldwide Interoperability for Microwave Access ("WiMAX" for short) communications system, or a future 5G system.

Figure 1:
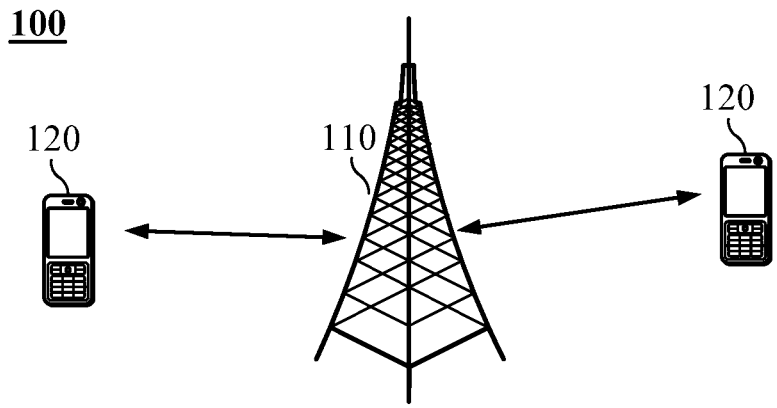
FIG. 1 is a schematic diagram of an application scenario according to an implementation of this application.

FIG. 1 shows a wireless communications system 100 to which an implementation of this application is applied. The wireless communications system 100 may include a network device 110. The network device 100 may be a device communicating with a terminal device. The network device 100 may provide communications coverage to a particular geographic area, and may communicate with a terminal device (for example, user equipment (UE)) located within the coverage area. In at least one implementation, the network device 100 may be a base transceiver station (BTS) in a GSM system or CDMA system, or may be a NodeB (NB) in a WCDMA system, or may be an evolved NodeB (eNB or eNodeB) in an LTE system, or a wireless controller in a cloud radio access network (CRAN), or the network device may be a relay station, an access point, an in-vehicle device, a wearable device, a network side device in a future 5G network, a network device in a future evolved public land mobile network (PLMN) or the like.

The wireless communications system 100 further includes at least one terminal device 120 located within the coverage range of the network device 110. The terminal device 120 may be mobile or fixed. Optionally, the terminal device 120 may be an access terminal, UE, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved PLMN or the like.

Optionally, the terminal devices 120 may perform device to device (D2D) communication with each other.

Optionally, the 5G system or network may also be referred to as an NR system or network.

FIG. 1 shows one network device and two terminal devices as an example. Optionally, the wireless communications system 100 may include a plurality of network devices and another number of terminal devices may be included in the coverage of each network device. This is not limited in this implementation of this application.

Optionally, the wireless communications system 100 may further include other network entities such as an access and mobility management function (AMF), a session management function (SMF), a unified data management (UDM), and an authentication server function (AUSF). This is not limited in this implementation of this application.

In addition, aspects or features of this application may be implemented as a method, an apparatus or a product that uses standard programming and/or engineering technologies. The term "product" used in this application covers a computer program that can be accessed from any computer-readable device, carrier or medium. For example, a computer-readable medium may include, but is not limited to: a magnetic storage device (such as a hard disk, a floppy disk, or a magnetic tape), an optical disc (such as a compact disk (CD), or a digital versatile disc (DVD)), a smartcard and a flash memory device (such as an erasable programmable read-only memory (EPROM), a card, a stick, or a key drive). In addition, various storage media described in this specification may indicate one or more devices and/or other machine-readable media that are used to store information. The term "machine-readable media" may include but is not limited to various media that can store, contain, and/or carry an instruction and/or data.

It should be understood that, terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

Figure 2:
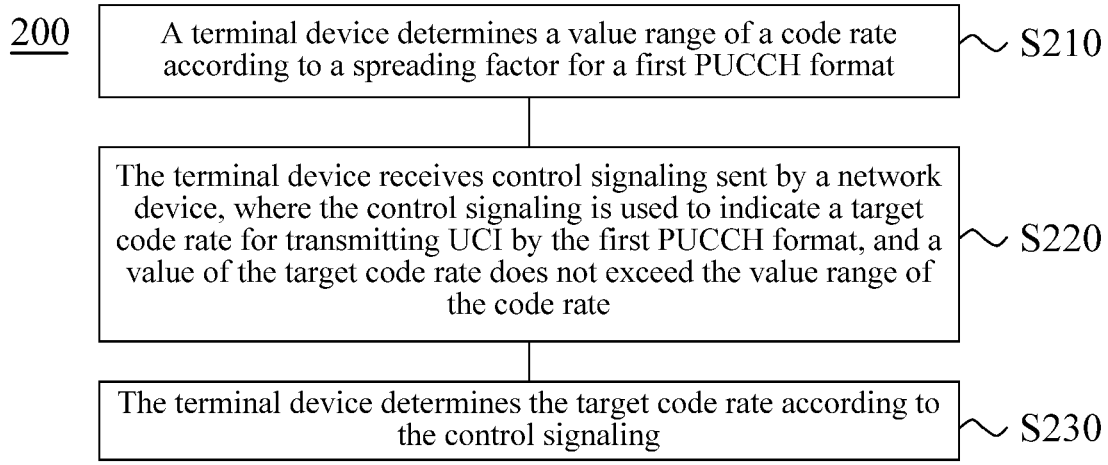
FIG. 2 is a schematic flowchart of a wireless communications method according to an implementation of this application.

FIG. 2 is a schematic flowchart of a wireless communications method 200 according to an implementation of this application. The method 200 may be optionally applied to the system shown in FIG. 1, but is not limited thereto. The method 200 includes at least a part of the following content.

S210. A terminal device determines a value range of a code rate according to a spreading factor for a first PUCCH format.

Optionally, the first PUCCH format may be PUCCH format 2, PUCCH format 3, or PUCCH format 4.

For example, a spreading factor of PUCCH format 2 and a spreading factor of PUCCH format 3 are 1, and a spreading factor of PUCCH format 4 is 2 or 4.

For example, Table 1 shows an orthogonal sequence $w_n(m)$ when the spreading factor of PUCCH format 4 is 2.

TABLE 1

| n | $w_n$ | | | | | | | | | | | |
|---|---|---|---|---|---|---|---|---|---|---|---|---|
| 0 | [+1 | +1 | +1 | +1 | +1 | +1 | +1 | +1 | +1 | +1 | +1 | +1] |
| 1 | [+1 | +1 | +1 | +1 | +1 | +1 | −1 | −1 | −1 | −1 | −1 | −1] |

For another example, Table 2 shows an orthogonal sequence $w_n(m)$ when the spreading factor of PUCCH format 4 is 4.

TABLE 2

| n | $w_n$ | | | | | | | | | | | |
|---|---|---|---|---|---|---|---|---|---|---|---|---|
| 0 | [+1 | +1 | +1 | +1 | +1 | +1 | +1 | +1 | +1 | +1 | +1 | +1] |
| 1 | [+1 | +1 | +1 | −j | −j | −j | −1 | −1 | −1 | +j | +j | +j] |
| 2 | [+1 | +1 | +1 | −1 | −1 | −1 | +1 | +1 | +1 | −1 | −1 | −1] |
| 3 | [+1 | +1 | +1 | +j | +j | +j | −1 | −1 | −1 | −j | −j | −j |

For example, Table 3 shows a maximum code rate r corresponding to PUCCH format 2/PUCCH format 3/PUCCH format 4.

TABLE 3

| n | Code rate r |
|---|---|
| 0 | 0.08 |
| 1 | 0.15 |
| 2 | 0.25 |
| 3 | 0.35 |
| 4 | 0.45 |
| 5 | 0.60 |
| 6 | 0.80 |
| 7 | Reserved |

Optionally, the terminal device may determine that a value of the code rate is less than or equal to a first parameter, where the first parameter is equal to 1 divided by N, and N is the spreading factor for the first PUCCH format. The terminal device may alternatively determine that a value of the code rate is greater than 0.

S220. The terminal device receives control signaling sent by a network device, where the control signaling is used to indicate a target code rate for transmitting UCI by the first PUCCH format, and a value of the target code rate does not exceed the value range of the code rate.

Optionally, the UCI includes ACK/NACK feedback information, and/or SR information, and/or CSI.

S230. The terminal device determines the target code rate according to the control signaling.

Optionally, the terminal device deems it undesirable that the target code rate is greater than or equal to the first parameter.

Optionally, the terminal device determines that the target code rate is a maximum code rate used to transmit UCI by the first PUCCH format.

Therefore, in the wireless communications method in this implementation of this application, the terminal device can determine the value range of the code rate according to the spreading factor for the first PUCCH format, so that the terminal device determines the target code rate for transmitting UCI in the value range of the code rate, thereby ensuring that UCI is reliably transmitted.

Figure 3:
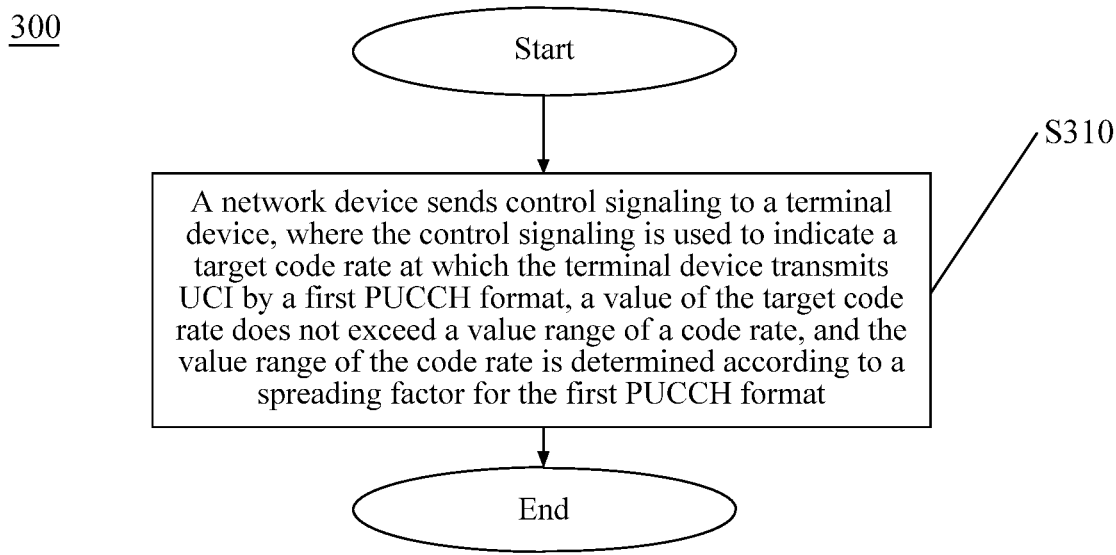
FIG. 3 is a schematic flowchart of another wireless communications method according to an implementation of this application.

FIG. 3 is a schematic flowchart of a wireless communications method 300 according to an implementation of this application. The method 300 may be optionally applied to the system shown in FIG. 1, but is not limited thereto. The method 300 includes at least a part of the following content.

S310. A network device sends control signaling to a terminal device, where the control signaling is used to indicate a target code rate at which the terminal device transmits UCI by a first PUCCH format, a value of the target code rate does not exceed a value range of a code rate, and the value range of the code rate is determined according to a spreading factor for the first PUCCH format.

It should be understood that, the wireless communications method 300 corresponds to corresponding steps in the method 200, and for steps in the wireless communications method 300, refer to the description of the corresponding steps in the wireless communications method 200. For brevity, details are not described herein again.

Therefore, in the wireless communications method in this implementation of this application, the network device sends the control signaling to the terminal device, where the control signaling indicates the target code rate at which the terminal device transmits UCI by the first PUCCH format, so that the terminal device may determine the target code rate for transmitting UCI in the value range of the code rate, thereby ensuring that UCI is reliably transmitted.

When the terminal device calculates a number of PRBs for transmitting UCI, the impact of spreading factors of different PUCCH formats is taken into account, so that after the number of PRBs for transmitting UCI is calculated, the PRBs can carry all UCI, thereby ensuring that UCI is reliably transmitted.

Figure 4:
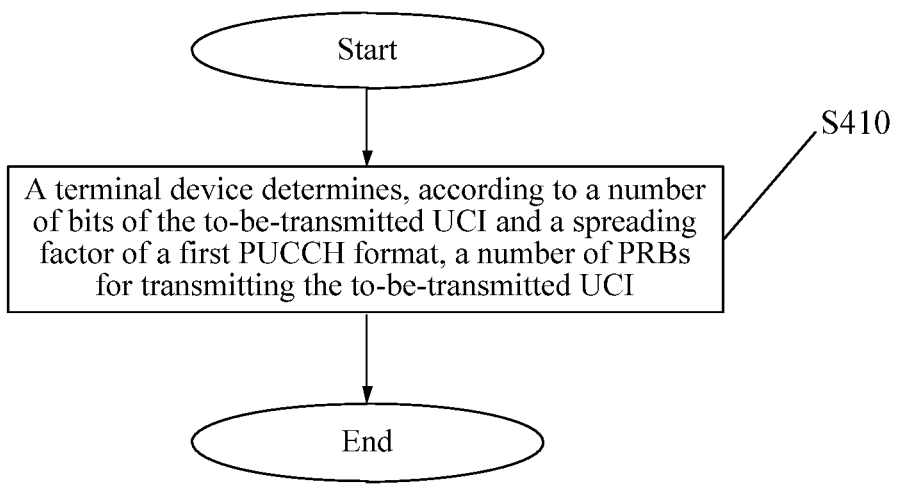
FIG. 4 is a schematic flowchart of still another wireless communications method according to an implementation of this application.

FIG. 4 is a schematic flowchart of a wireless communications method 400 according to an implementation of this application. The method 400 may be optionally applied to the system shown in FIG. 1, but is not limited thereto. The method 400 includes at least a part of the following content.

S410. A terminal device determines, according to a number of bits of the to-be-transmitted UCI and a spreading factor of a first PUCCH format, a number of PRBs for transmitting the to-be-transmitted UCI.

Optionally, the to-be-transmitted UCI includes ACK/NACK feedback information, and/or SR information, and/or CSI.

Optionally, the first PUCCH format may be PUCCH format 2, PUCCH format 3, or PUCCH format 4.

For example, a spreading factor of PUCCH format 2 and a spreading factor of PUCCH format 3 are 1, and a spreading factor of PUCCH format 4 is 2 or 4.

Specifically, the terminal device determines, according to a number of bits of the to-be-transmitted UCI, the spreading factor of the first PUCCH format, and a first parameter. the number of PRBs for transmitting the to-be-transmitted UCI, where the first parameter includes at least one of a number of subcarriers for the first PUCCH format to transmit UCI in one RB, a number of time domain symbols for the first PUCCH format to transmit UCI, a modulation order, a maximum code rate corresponding to the first PUCCH format, and a maximum number of PRBs that corresponds to the first PUCCH format.

Optionally, the number $M_{RB,min}^{PUCCH}$ of PRBs for transmitting the to-be-transmitted UCI determined by the terminal device may satisfy Formula 1:

$$M_{RB,min}^{PUCCH} = \left\lceil \frac{O_{UCI} + O_{CRC}}{N_{sc,ctrl}^{RB} \cdot N_{symb}^{PUCCH} \cdot Q_m \cdot r / N_{SF}^{PUCCH}} \right\rceil,$$

where $O_{UCI}$ represents a number of bits of the UCI, $O_{CRC}$ represents a number of bits of a CRC code, $N_{sc,ctrl}^{RB}$ represents the number of subcarriers for the first PUCCH format to transmit UCI in one RB, $N_{symb}^{PUCCH}$ represents the number of time domain symbols for the first PUCCH format to transmit UCI, $Q_m$ represents the modulation order, r represents the maximum code rate corresponding to the first PUCCH format, and $N_{SF}^{PUCCH}$ represents the spreading factor of the first PUCCH format.

Optionally, the number $M_{RB,min}^{PUCCH}$ of PRBs for transmitting the to-be-transmitted UCI determined by the terminal device may satisfy Formula 2:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r / N_{SF}^{PUCCH}$, and when the maximum number of PRBs that corresponds to the first PUCCH format is greater than 1, $(O_{UCI}+O_{CRC}) > (M_{RB,min}^{PUCCH}-1) \cdot N_{sc,ctrl}^{RB} \cdot N_{symb}^{PUCCH} \cdot Q_m \cdot r / N_{SF}^{PUCCH}$, where $O_m$ represents a number of bits of the UCI, CRC represents a number of bits of a CRC, $N_{sc,ctrl}^{RB}$ represents the number of subcarriers for the first PUCCH format to transmit UCI in one RB, $N_{symb}^{PUCCH}$ represents the number of time domain symbols for the first PUCCH format to transmit UCI, $Q_m$ represents the modulation order, r represents the maximum code rate corresponding to the first PUCCH format, and $N_{SF}^{PUCCH}$ represents the spreading factor of the first PUCCH format.

In the foregoing Formula 2, if the first PUCCH format is PUCCH format 4, and the spreading factor of PUCCH format 4 is 2, an optional configuration range of the maximum code rate r corresponding to PUCCH format 4 is 0 to 4, and the maximum code rate r may be specifically a code rate r corresponding to n being any one of 0 to 4 as shown in Table 3.

In the foregoing Formula 2, if the first PUCCH format is PUCCH format 4, and the spreading factor of PUCCH format 4 is 4, an optional configuration range of the maximum code rate r corresponding to PUCCH format 4 is 0 to 1, and the maximum code rate r may be specifically a code rate r corresponding to n being 0 or 1 as shown in Table 3.

Optionally, the number $M_{RB,min}^{PUCCH}$ determined by the terminal device may satisfy Formula 3:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r$, and when the maximum number of PRBs that corresponds to the first PUCCH format is greater than 1, $(O_{UCI}+O_{CRC}) > (M_{RB,min}^{PUCCH}-1) \cdot N_{sc,ctrl}^{RB} \cdot N_{symb}^{PUCCH} \cdot Q_m \cdot r$, where $Q_{UCI}$ represents a number of bits of the UCI, $O_{CRC}$ represents a number of bits of a CRC, $N_{sc,ctrl}^{RB}$ represents the number of subcarriers for the first PUCCH format to transmit UCI in one RB divided by $N_{SF}^{PUCCH}$, $N_{SF}^{PUCCH}$ represents the spreading factor of the first PUCCH format, $N_{symb}^{PUCCH}$ represents the number of time domain symbols for the first PUCCH format to transmit UCI, $Q_m$ represents the modulation order, and r represents the maximum encode rate corresponding to the first PUCCH format.

Optionally, the number $M_{RB,min}^{PUCCH}$ of PRBs for transmitting the to-be-transmitted UCI determined by the terminal device may satisfy Formula 4:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r$, and when the maximum number of PRBs that corresponds to the first PUCCH format is greater than 1, $(O_{UCI}+O_{CRC}) > (M_{RB,min}^{PUCCH}-1) \cdot N_{sc,ctrl}^{RB} \cdot N_{symb}^{PUCCH} \cdot Q_m \cdot r$, where $Q_{UCI}$ represents a number of bits of the UCI, $O_{CRC}$ represents a number of bits of a CRC, $N_{sc,ctrl}^{RB}$ represents the number of subcarriers for the first PUCCH format to transmit UCI in one RB, $N_{symb}^{PUCCH}$ represents the number of time domain symbols for the first PUCCH format to transmit UCI divided by $N_{SF}^{PUCCH}$, $N_{SF}^{PUCCH}$ represents the spreading factor of the first PUCCH format, $Q_m$ represents the modulation order, and r represents the maximum encode rate corresponding to the first PUCCH format.

Optionally, the number $M_{RB,min}^{PUCCH}$ of PRBs for transmitting the to-be-transmitted UCI determined by the terminal device may satisfy Formula 5:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r$, and when the maximum number of PRBs that corresponds to the first PUCCH format is greater than 1, $(O_{UCI}+O_{CRC}) \leq M_{RB,min}^{PUCCH} \cdot N_{sc,ctrl}^{RB} \cdot N_{symb}^{PUCCH} \cdot Q_m \cdot r$, where $O_{UCI}$ represents a number of bits of the UCI, $O_{CRC}$ represents a number of bits of a CRC, $N_{sc,ctrl}^{RB}$ represents the number of subcarriers for the first PUCCH format to transmit UCI in one RB, $N_{symb}^{PUCCH}$ represents the number of time domain symbols for the first PUCCH format to transmit UCI, $Q_m$ represents the modulation order divided by $N_{SF}^{PUCCH}$, $N_{SF}^{PUCCH}$ represents the spreading factor of the first PUCCH format, and r represents the maximum encode rate corresponding to the first PUCCH format.

Optionally, the number $M_{RB,min}^{PUCCH}$ of PRBs for transmitting the to-be-transmitted UCI determined by the terminal device may satisfy Formula 6:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r / N_{SF}^{PUCCH}$, and when the maximum number of PRBs that corresponds to the first PUCCH format is greater than 1, $(O_{UCI}+O_{CRC}) \leq M_{RB,min}^{PUCCH} \cdot N_{sc,ctrl}^{RB} \cdot N_{symb}^{PUCCH} \cdot Q_m \cdot r / N_{SF}^{PUCCH}$, where $O_{UCI}$ represents a number of bits of the UCI, $O_{CRC}$ represents a number of bits of a CRC, $Q_m$ represents the modulation order, and r represents the maximum encode rate corresponding to the first PUCCH format, $N_{sc,ctrl}^{RB}$ represents the number of subcarriers for the first PUCCH format to transmit UCI in one RB, to be specific, for PUCCH format 2, $N_{sc,ctrl}^{RB}=4$, and for PUCCH formats 3 and 4, $N_{sc,ctrl}^{RB}=N_{sc}^{RB}$, and $N_{sc}^{RB}$ represents the number of subcarriers in one RB;

$N_{symb}^{PUCCH}$ represents the number of time domain symbols for the first PUCCH format to transmit UCI, to be specific, for PUCCH format 2, $N_{symb}^{PUCCH}$ represents a number of symbols included in PUCCH format 2 configured by higher layer signaling, for PUCCH format 3, $N_{symb}^{PUCCH}$ represents a number of symbols other than DMRS symbols included in PUCCH format 3 configured by higher layer signaling, and for PUCCH format 4, $N_{symb}^{PUCCH}$ represents a number of symbols other than DMRS symbols included in PUCCH format 4 configured by higher layer signaling; and $N_{SF}^{PUCCH}$ represents the spreading factor of the first PUCCH format, to be specific, for PUCCH formats 2 and 3, $N_{SF}^{PUCCH}=1$, and for PUCCH format 4, $N_{SF}^{PUCCH}=N_{SF}^{PUCCH,4}$ and $N_{SF}^{PUCCH,4}$ is a spreading factor of PUCCH format 4.

Optionally, the number $M_{RB,min}^{PUCCH}$ of PRBs for transmitting the to-be-transmitted UCI determined by the terminal device may satisfy Formula 7:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r$, and when $M_{RB}^{PUCCH} > 1$, $(O_{UCI}+O_{CRC}) \leq M_{RB,min}^{PUCCH} \cdot N_{sc,ctrl}^{RB} \cdot N_{symb}^{PUCCH} \cdot Q_m \cdot r$, where $O_{UCI}$ represents a number of bits of the UCI, $O_{CRC}$ represents a number of bits of a CRC, $Q_m$ represents the modulation order, r represents the maximum encode rate corresponding to the first PUCCH format, $N_{sc,ctrl}^{RB}$ represents the number of subcarriers for the first PUCCH format to transmit UCI in one RB, to be specific, for PUCCH format 2, $N_{sc,ctrl}^{RB}=N_{sc}^{RB}-4$, for PUCCH format 3, $N_{sc,ctrl}^{RB}=N_{sc}^{RB}$, and for PUCCH format 4, $N_{sc,ctrl}^{RB}=N_{sc}^{RB}/N_{SF}^{PUCCH,4}$, $N_{sc}^{RB}$ represents the number of subcarriers in one RB, and $N_{SF}^{PUCCH,4}$ is the spreading factor of the first PUCCH format; and $N_{symb}^{PUCCH}$ represents the number of time domain symbols for the first PUCCH format to transmit UCI, to be specific, for PUCCH format 2, $N_{symb}^{PUCCH}$ represents a number of symbols included in PUCCH format 2 configured by higher layer signaling, for PUCCH format 3, $N_{symb}^{PUCCH}$ represents a number of symbols other than DMRS symbols included in PUCCH format 3 configured by higher layer signaling, and for PUCCH format 4, $N_{symb}^{PUCCH}$ represents a number of symbols other than DMRS symbols included in PUCCH format 4 configured by higher layer signaling.

It should be understood that, the wireless communications method 400 corresponds to corresponding steps in the method 200, and for steps in the wireless communications method 400, refer to the description of the corresponding steps in the wireless communications method 200. For brevity, details are not described herein again.

Therefore, in the wireless communications method in this implementation of this application, when the terminal device determines a number of PRBs for transmitting UCI, the impact of the spreading factor of the first PUCCH format is taken into account, so that after the number of PRBs for transmitting UCI is determined, the PRBs can carry all UCI, thereby ensuring that UCI is reliably transmitted.

Figure 5:
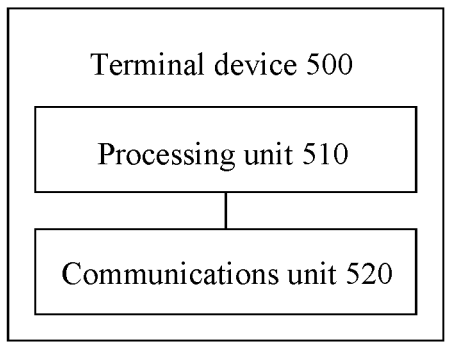
FIG. 5 is a schematic block diagram of a terminal device according to an implementation of this application.

FIG. 5 is a schematic block diagram of a terminal device 500 according to an implementation of this application. The terminal device 500 includes:

a processing unit 510, configured to determine a value range of a code rate according to a spreading factor for a first PUCCH format; and a communications unit 520, configured to receive control signaling sent by a network device, where the control signaling is used to indicate a target code rate for transmitting UCI by the first PUCCH format, and a value of the target code rate does not exceed the value range of the code rate, where the processing unit 510 is further configured to determine the target code rate according to the control signaling.

Optionally, the processing unit 510 is specifically configured to:

determine that a value of the code rate is less than or equal to a first parameter, where the first parameter is equal to 1 divided by N, and N is the spreading factor for the first PUCCH format; and/or determine that a value of the code rate is greater than 0.

Optionally, the processing unit 510 is specifically configured to:

deem it undesirable that the target code rate is greater than or equal to the first parameter.

Optionally, the processing unit 510 is specifically configured to:

determine that the target code rate is a maximum code rate used to transmit UCI by the first PUCCH format.

It should be understood that, the terminal device 500 may correspond to the terminal device in the method 200, and may implement corresponding operations performed by the terminal device in the method 200. For brevity, details are not described herein again.

Figure 6:
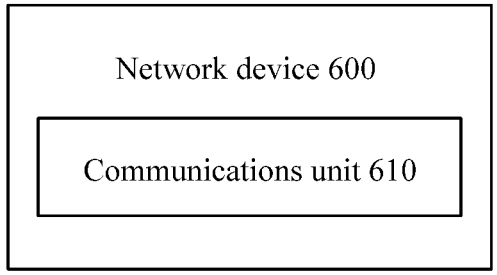
FIG. 6 is a schematic block diagram of a network device according to an implementation of this application.

FIG. 6 is a schematic block diagram of a network device 600 according to an implementation of this application. The network device 600 includes:

a communications unit 610, configured to send control signaling to a terminal device, where the control signaling is used to indicate a target code rate at which the terminal device transmits UCI by a first PUCCH format, a value of the target code rate does not exceed a value range of a code rate, and the value range of the code rate is determined according to a spreading factor for the first PUCCH format.

It should be understood that, the network device 600 may correspond to the network device in the method 300, and may implement corresponding operations performed by the network device in the method 300. For brevity, details are not described herein again.

Figure 7:
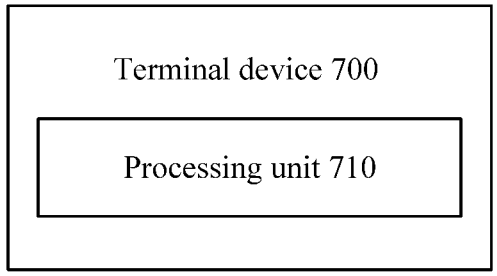
FIG. 7 is a schematic block diagram of another terminal device according to an implementation of this application.

FIG. 7 is a schematic block diagram of a terminal device 700 according to an implementation of this application. The terminal device 700 includes:

a processing unit 710, configured to determine, according to a number of bits of the to-be-transmitted UCI and a spreading factor of a first PUCCH format, a number of PRBs for transmitting the to-be-transmitted UCI.

Optionally, the processing unit 810 is specifically configured to:

determine, according to a number of bits of the to-be-transmitted UCI, the spreading factor of the first PUCCH format, and a first parameter, the number of PRBs for transmitting the to-be-transmitted UCI, where the first parameter includes at least one of a number of subcarriers for the first PUCCH format to transmit UCI in one RB, a number of time domain symbols for the first PUCCH format to transmit UCI, a modulation order, a maximum code rate corresponding to the first PUCCH format, and a maximum number of PRBs that corresponds to the first PUCCH format.

Optionally, the number $M_{RB,min}^{PUCCH}$ of PRBs for transmitting the to-be-transmitted UCI satisfies:

$(O_{UCI}+O_{CRC}) \leq M_{RB,min}^{PUCCH} \cdot N_{sc,ctrl}^{RB} \cdot N_{symb}^{PUCCH} \cdot Q_m \cdot r/N_{SF}^{PUCCH}$, and when the maximum number of PRBs that corresponds to the first PUCCH format is greater than 1, $(O_{UCI}+O_{CRC}) \leq M_{RB,min}^{PUCCH} \cdot N_{sc,ctrl}^{RB} \cdot N_{symb}^{PUCCH} \cdot Q_m \cdot r/N_{SF}^{PUCCH}$; or $$M_{RB,min}^{PUCCH} = \left\lceil \frac{O_{UCI}+O_{CRC}}{N_{sc,ctrl}^{RB} \cdot N_{symb}^{PUCCH} \cdot Q_m \cdot r/N_{SF}^{PUCCH}} \right\rceil,$$

where $O_{UCI}$ represents a number of bits of the UCI, $O_{CRC}$ represents a number of bits of a CRC code, $N_{sc,ctrl}^{RB}$ represents the number of subcarriers for the first PUCCH format to transmit UCI in one RB, $N_{symb}^{PUCCH}$ represents the number of time domain symbols for the first PUCCH format to transmit UCI, $Q_m$ represents the modulation order, r represents the maximum code rate corresponding to the first PUCCH format, and $N_{SF}^{PUCCH}$ represents the spreading factor of the first PUCCH format.

Optionally, the number $M_{RB,min}^{PUCCH}$ of PRBs for transmitting the to-be-transmitted UCI satisfies:
$(O_{UCI}+O_{CRC}) \leq M_{RB,min}^{PUCCH} \cdot N_{sc,ctrl}^{RB} \cdot N_{symb}^{PUCCH} \cdot Q_m \cdot r$, and when the maximum number of PRBs that corresponds to the first PUCCH format is greater than 1, $(O_{UCI}+O_{CRC}) \leq M_{RB,min}^{PUCCH} \cdot N_{sc,ctrl}^{RB} \cdot N_{symb}^{PUCCH} \cdot Q_m \cdot r$; or $$M_{RB,min}^{PUCCH} = \left\lceil \frac{O_{UCI}+O_{CRC}}{N_{sc,ctrl}^{RB} \cdot N_{symb}^{PUCCH} \cdot Q_m \cdot r} \right\rceil,$$

where $O_{UCI}$ represents a number of bits of the UCI, $O_{CRC}$ represents a number of bits of a CRC, $N_{sc,ctrl}^{RB}$ represents the number of subcarriers for the first PUCCH format to transmit UCI in one RB divided by $N_{SF}^{PUCCH}$, $N_{SF}^{PUCCH}$, represents the spreading factor of the first PUCCH format, $N_{symb}^{PUCCH}$ represents the number of time domain symbols for the first PUCCH format to transmit UCI, $Q_m$ represents the modulation order, and r represents the maximum code rate corresponding to the first PUCCH format.

Optionally, the to-be-transmitted UCI includes ACK/NACK feedback information, and/or SR information, and/or CSI.

It should be understood that, the terminal device 700 may correspond to the terminal device in the method 400, and may implement corresponding operations performed by the terminal device in the method 400. For brevity, details are not described herein again.

Figure 8:
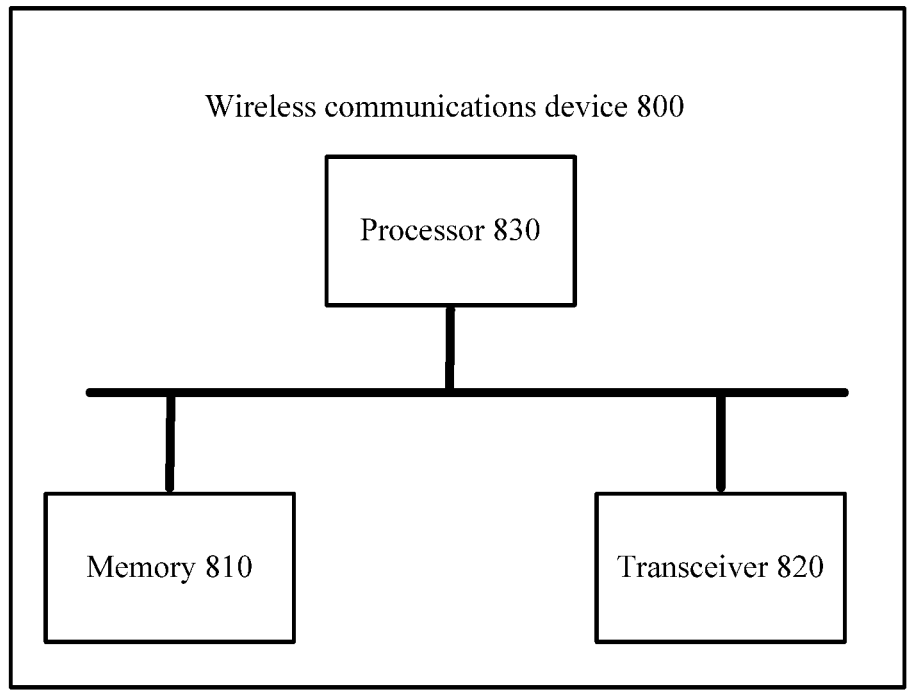
FIG. 8 is a schematic block diagram of a wireless communications device according to an implementation of this application.

FIG. 8 is a schematic block diagram of a wireless communications device 800 according to an implementation of this application. The device 800 includes:

a memory 810, configured to store a program, where the program includes code;

a transceiver 820, configured to communicate with another device; and a processor 830, configured to execute the program code in the memory 810.

Optionally, the transceiver 820 is configured to specifically receive or transmit signal under driving of the processor 830.

Optionally, when the code is executed, the processor 830 may further implement each operation performed by the terminal device in the method 200 in FIG. 2 and/or the method 400 in FIG. 4. For brevity, details are not described herein again. In this case, the device 800 may be a terminal device, for example, a mobile phone.

Optionally, when the code is executed, the processor 830 may implement each operation performed by the network device in the method 300 in FIG. 3. For brevity, details are not described herein again. In this case, the device 800 may be a network device, for example, a base station.

It should be understood that, in this implementation of this application, the processor 830 may be a central processing unit (CPU), or the processor 830 may be another general-purpose processor, a digital signal processor (DSP), an application-specific integrated circuit (ASIC), a field programmable gate array (FPGA), or another programmable logical device, discrete gate or transistor logical device, or discrete hardware component, or the like. The general-purpose processor may be a microprocessor, or the processor may be any conventional processor or the like.

The memory 810 may include a read-only memory (ROM) and a random access memory (RAM), and provide an instruction and data to the processor 830. A part of the memory 810 may further include a non-volatile RAM. For example, the memory 810 may further store information about a device type.

The transceiver 820 may be configured to implement signal transmission and receiving functions, for example, frequency modulation and demodulation functions or up-conversion and down-conversion functions.

During implementation, at least one step of the foregoing method may be completed through an integrated logic circuit of hardware in the processor 830, or the integrated logic circuit may complete the at least one step under driving of an instruction in a software form. Therefore, the wireless communications device 800 may be a chip or chip set. Steps of the methods disclosed with reference to the implementations of this application may be directly executed and completed by means of a hardware processor, or may be executed and completed by using a combination of hardware and software modules in the processor. The software module may be located in a mature storage medium in the art, such as a RAM, a flash memory, a ROM, a programmable ROM, an electrically erasable programmable memory, or a register. The storage medium is located in the memory, and the processor 830 reads information in the memory and completes the steps in the foregoing methods in combination with hardware of the processor. To avoid repetition, details are not described herein again.

Figure 9:
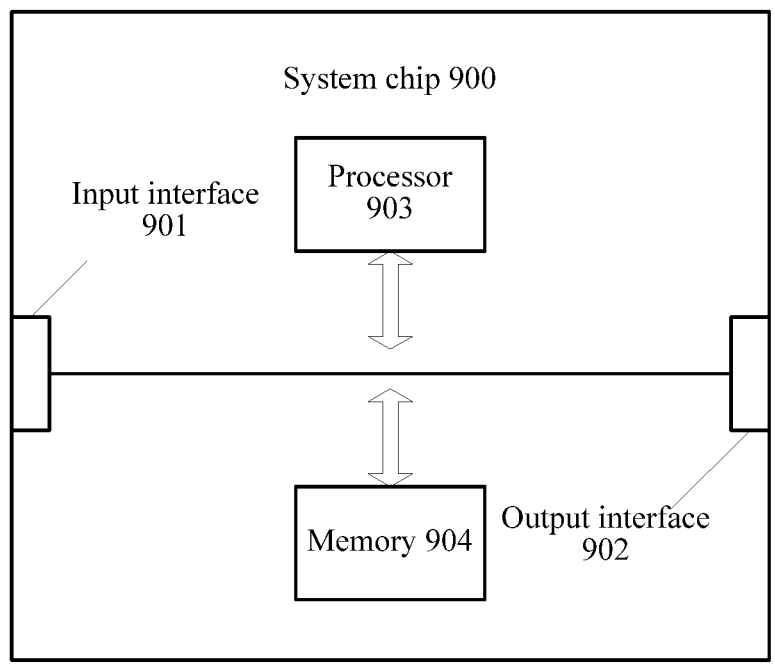
FIG. 9 is a schematic structural diagram of a system chip according to an implementation of this application.

FIG. 9 is a schematic structural diagram of a system chip 900 according to an implementation of this application. The system chip 900 in FIG. 9 includes an input interface 901, an output interface 902, a processor 903, and a memory 904 that may be connected to each other by an internal communications connection line, and the processor 903 is configured to execute code in the memory 904.

Optionally, when the code is executed, the processor 903 implements the method performed by the terminal device in the method implementation. For brevity, details are not described herein again.

Optionally, when the code is executed, the processor 903 implements the method performed by the network device in the method implementation. For brevity, details are not described herein again.

All or some of the foregoing implementations may be implemented by using software, hardware, firmware, or any combination thereof. When software is used for implementation, implementation may be entirely or partially performed in the form of a computer program product. The computer program product includes one or more computer instructions. When the computer program instructions are loaded and executed on the computer, the procedures or functions described according to the implementations of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

It should be understood that in various implementations of this application, an order of sequence numbers of the foregoing processes does not indicate an execution sequence, and execution sequences of the processes should be determined according to functions and internal logics thereof and should not impose any limitation on an implementation process of the implementations of this application.

It may be clearly understood by a person skilled in the art that, for the purpose of convenient and brief description, for a detailed working process of the system, apparatus, and unit, refer to a corresponding process in the method implementations. Details are not described herein again.

The descriptions are only specific implementations of this application, but are not intended to limit the protection scope of this application. Any variation or replacement readily figured out by persons skilled in the art within the technical scope disclosed in this application shall fall within the protection scope of this application. Therefore, the protection scope of this application shall be subject to the protection scope of the claims.

What is claimed is:

1. A wireless communications method, comprising:
   determining, by a terminal device, a number of physical resource blocks (PRBs) for transmitting uplink control information (UCI);
   wherein the UCI is transmitted by using a first physical uplink control channel (PUCCH) format, and the number $M_{PRB,min}^{PUCCH}$ of PRBs for transmitting the UCI satisfies:
   $(O_{UCI}+O_{CRC}) \leq M_{PRB,min}^{PUCCH} \cdot N_{sc,ctrl}^{PRB} \cdot N_{symb}^{PUCCH} \cdot Q_m \cdot r$,
   and
   $(O_{UCI}+O_{CRC}) > (M_{PRB,min}^{PUCCH}-1) \cdot N_{sc,ctrl}^{PRB} \cdot N_{symb}^{PUCCH} \cdot Q_m \cdot r$, wherein $O_{UCI}$ represents a number of bits of the UCI, $O_{CRC}$ represents a number of bits of a CRC, $N_{sc,ctrl}^{PRB}$ represents a number of subcarriers for the first PUCCH format to transmit the UCI in one PRB divided by $N_{SF}^{PUCCH}$, $N_{SF}^{PUCCH}$ represents a spreading factor of the first PUCCH format, $N_{symb}^{PUCCH}$ represents a number of time domain symbols for the first PUCCH format to transmit the UCI, $Q_m$ represents a modulation order, and r represents a maximum code rate corresponding to the first PUCCH format,
   wherein the first PUCCH format is PUCCH format 2, PUCCH format 3 or PUCCH format 4.

2. The method according to claim 1, wherein the number $N_{sc,ctrl}^{PRB}$ of subcarriers for the first PUCCH format to transmit the UCI in one PRB satisfies:
   $N_{sc,ctrl}^{PRB}=N_{sc}^{PRB}-4$ when the first PUCCH format is PUCCH format 2; or
   $N_{sc,ctrl}^{PRB}=N_{sc}^{PRB}$ when the first PUCCH format is PUCCH format 3 or PUCCH format 4;
   wherein $N_{sc}^{PRB}$ represents a number of subcarriers in one PRB.

3. The method according to claim 1, wherein the method further comprises: transmitting, by the terminal device, the UCI using the determined number of PRBs.

4. The method according to claim 1, wherein the UCI comprises acknowledgement (ACK)/negative ACK (NACK) feedback information, and/or scheduling request (SR) information, and/or channel state information (CSI).

5. A terminal device, comprising:
   a processor, configured to determine a number of physical resource blocks (PRBs) for transmitting uplink control information (UCI);
   wherein the UCI is transmitted by using a first physical uplink control channel (PUCCH) format, and the number $M_{PRB,min}^{PUCCH}$ of PRBs for transmitting the UCI satisfies:
   $(O_{UCI}+O_{CRC}) \leq M_{PRB,min}^{PUCCH} \cdot N_{sc,ctrl}^{PRB} \cdot N_{symb}^{PUCCH} \cdot Q_m \cdot r$,
   and
   $(O_{UCI}+O_{CRC}) > (M_{PRB,min}^{PUCCH}-1) \cdot N_{sc,ctrl}^{PRB} \cdot N_{symb}^{PUCCH} \cdot Q_m \cdot r$, wherein $O_{UCI}$ represents a number of bits of the UCI, $O_{CRC}$ represents a number of bits of a CRC, $N_{sc,ctrl}^{PRB}$ represents a number of subcarriers for the first PUCCH format to transmit the UCI in one PRB divided by $N_{SF}^{PUCCH}$, $N_{SF}^{PUCCH}$ represents a spreading factor of the first PUCCH format, $N_{symb}^{PUCCH}$ represents a number of time domain symbols for the first PUCCH format to transmit the UCI, $Q_m$ represents a modulation order, and r represents a maximum code rate corresponding to the first PUCCH format,
   wherein the first PUCCH format is PUCCH format 2, PUCCH format 3 or PUCCH format 4.

6. The terminal device according to claim 5, wherein the number $N_{sc,ctrl}^{PRB}$ of subcarriers for the first PUCCH format to transmit the UCI in one PRB satisfies:
   $N_{sc,ctrl}^{PRB}=N_{sc}^{PRB}-4$ when the first PUCCH format is PUCCH format 2; or
   $N_{sc,ctrl}^{PRB}=N_{sc}^{PRB}$ when the first PUCCH format is PUCCH format 3 or PUCCH format 4;
   wherein $N_{sc}^{PRB}$ represents a number of subcarriers in one PRB.

7. The terminal device according to claim 5, wherein the processor is configured to:
   transmit the UCI using the determined number of PRBs.

8. The terminal device according to claim 5, wherein the UCI comprises acknowledgement (ACK)/negative ACK (NACK) feedback information, and/or scheduling request (SR) information, and/or channel state information (CSI).

* * * * *